May 17, 1960 W. J. KINDERMAN 2,936,772
STEAM TRAP
Filed Oct. 19, 1953 14 Sheets-Sheet 1
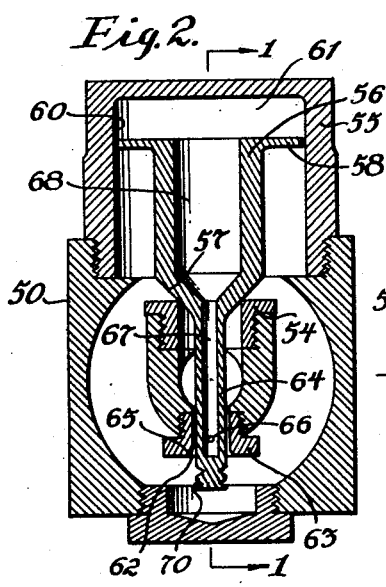
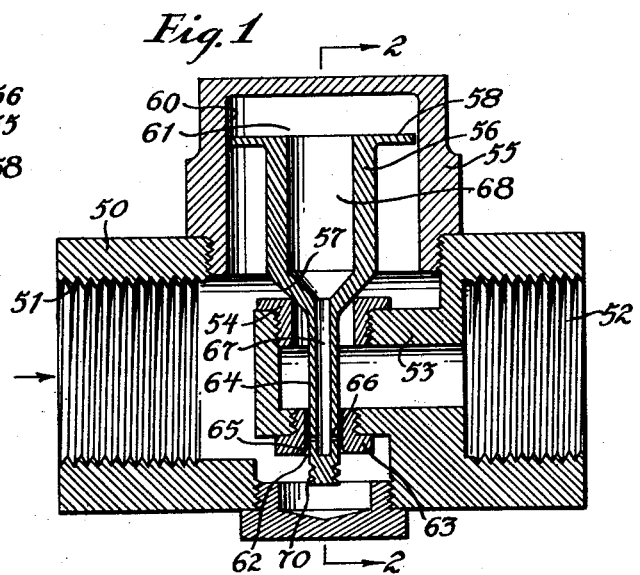
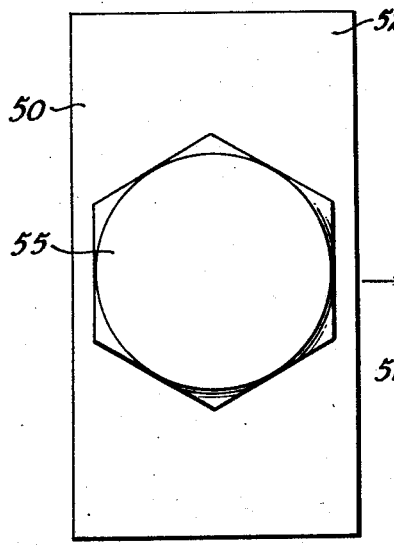
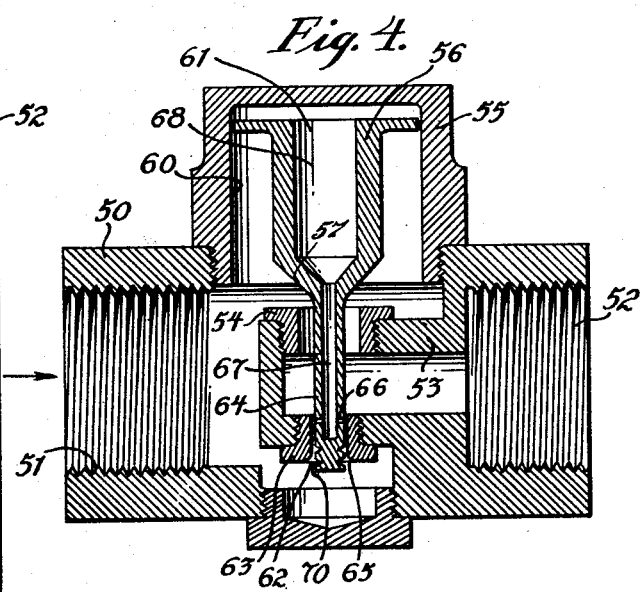
INVENTOR
WALTER J. KINDERMAN
ATTORNEYS May 17, 1960  W. J. KINDERMAN  2,936,772
STEAM TRAP Filed Oct. 19, 1953  14 Sheets-Sheet 2

INVENTOR
WALTER J. KINDERMAN
BY
ATTORNEYS

INVENTOR
WALTER J. KINDERMAN
BY
ATTORNEYS

May 17, 1960 W. J. KINDERMAN 2,936,772
STEAM TRAP
Filed Oct. 19, 1953 14 Sheets-Sheet 4
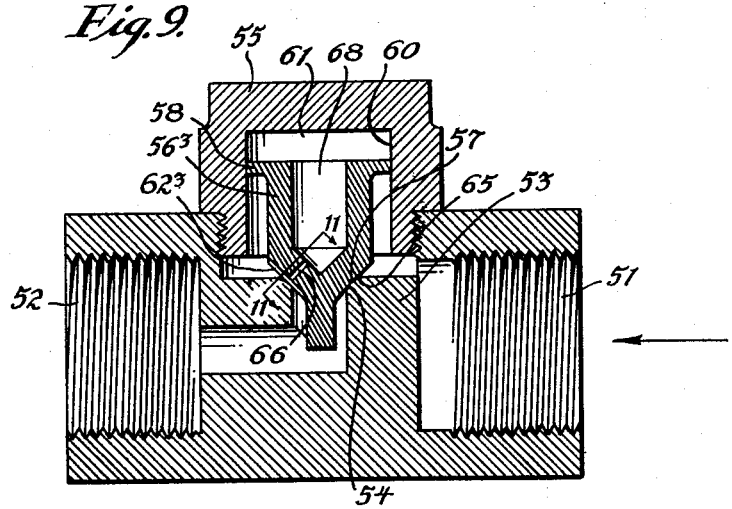
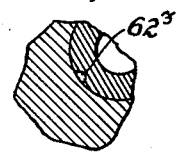
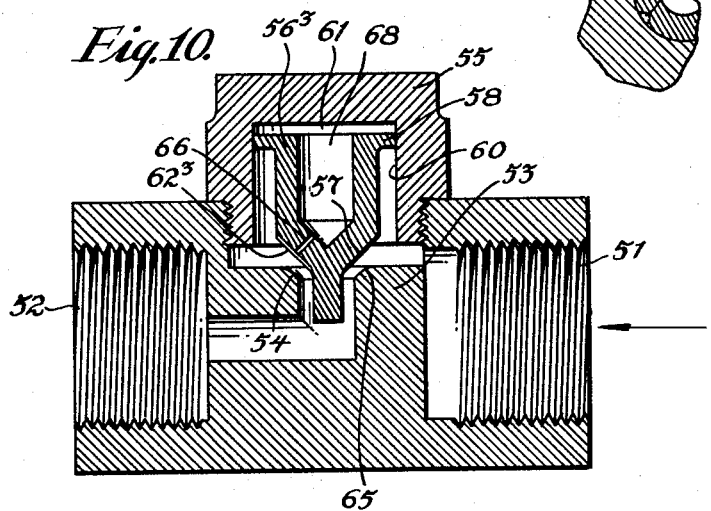
INVENTOR
WALTER J. KINDERMAN
ATTORNEYS May 17, 1960  W. J. KINDERMAN  2,936,772
STEAM TRAP
Filed Oct. 19, 1953  14 Sheets-Sheet 5
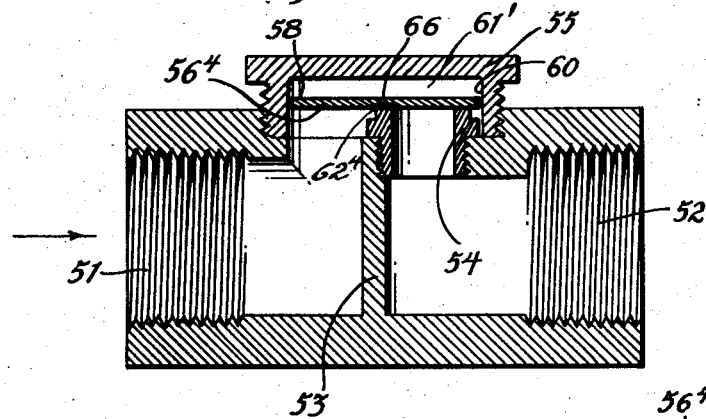
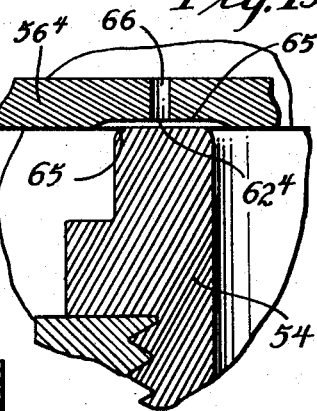
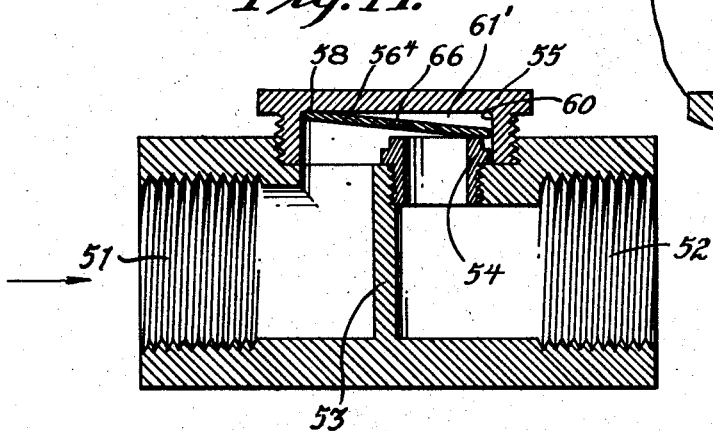
INVENTOR
WALTER J. KINDERMAN
BY
ATTORNEYS

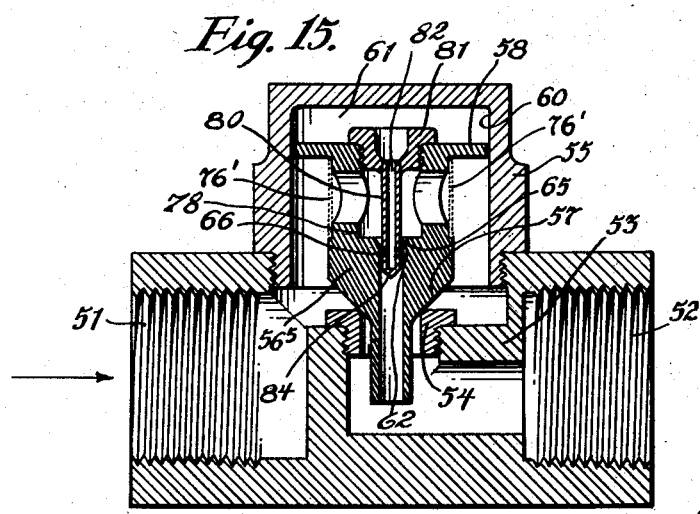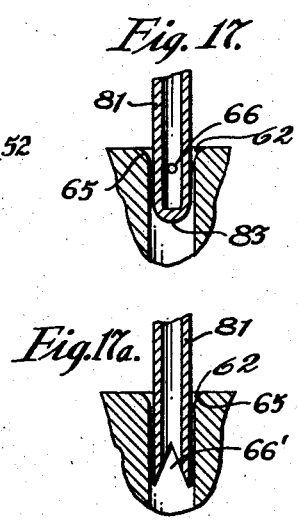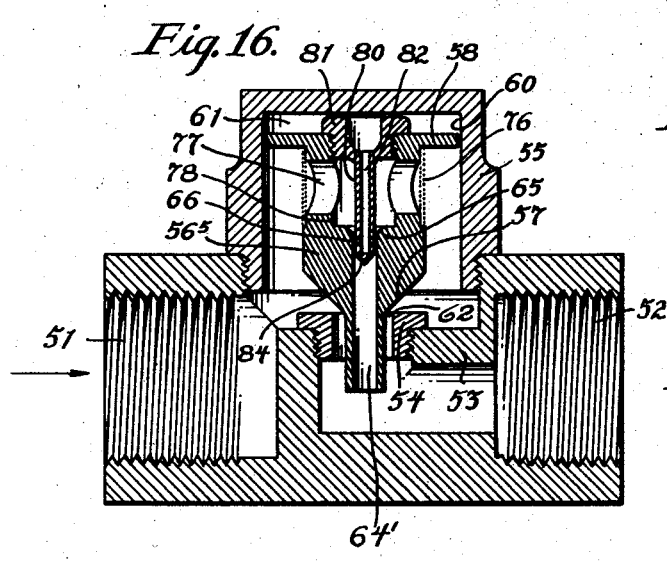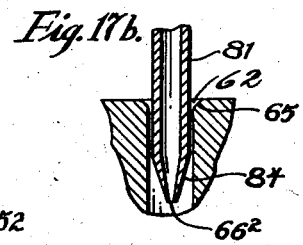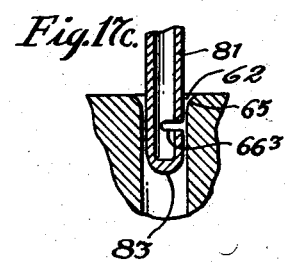

INVENTOR
WALTER J. KINDERMAN
BY
ATTORNEYS

May 17, 1960 W. J. KINDERMAN 2,936,772
STEAM TRAP
Filed Oct. 19, 1953 14 Sheets-Sheet 8
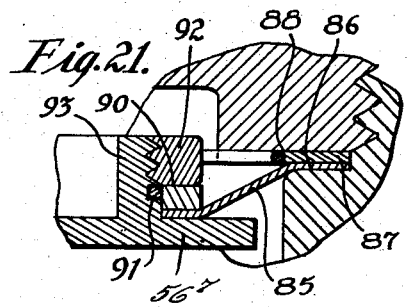
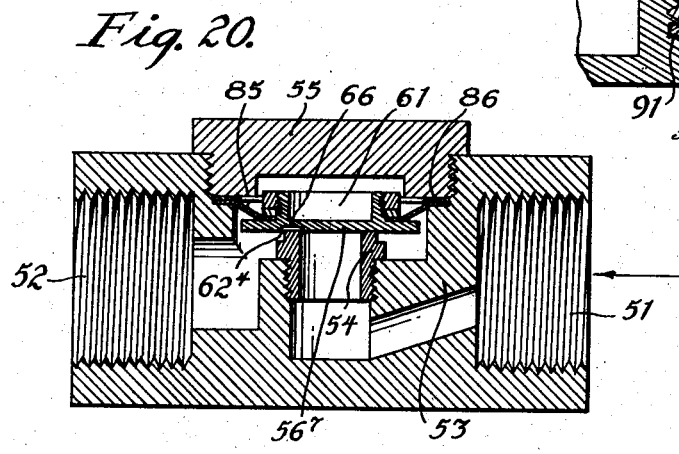
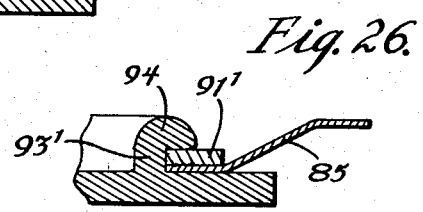
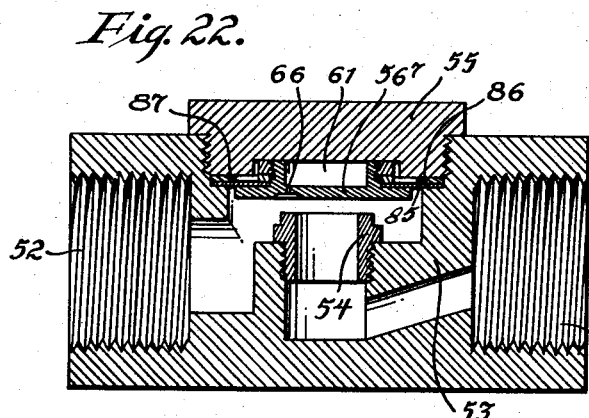
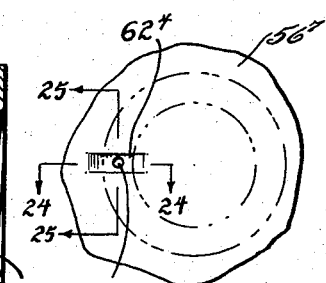
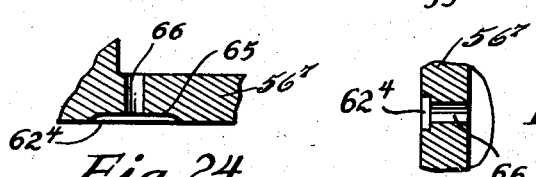
INVENTOR
WALTER J. KINDERMAN
BY
ATTORNEYS May 17, 1960 W. J. KINDERMAN 2,936,772
STEAM TRAP
Filed Oct. 19, 1953 14 Sheets-Sheet 9

INVENTOR
WALTER J. KINDERMAN
BY
ATTORNEYS

May 17, 1960 W. J. KINDERMAN 2,936,772
STEAM TRAP
Filed Oct. 19, 1953 14 Sheets-Sheet 10

INVENTOR
WALTER J. KINDERMAN
BY
ATTORNEYS

May 17, 1960    W. J. KINDERMAN    2,936,772
STEAM TRAP
Filed Oct. 19, 1953      14 Sheets-Sheet 11
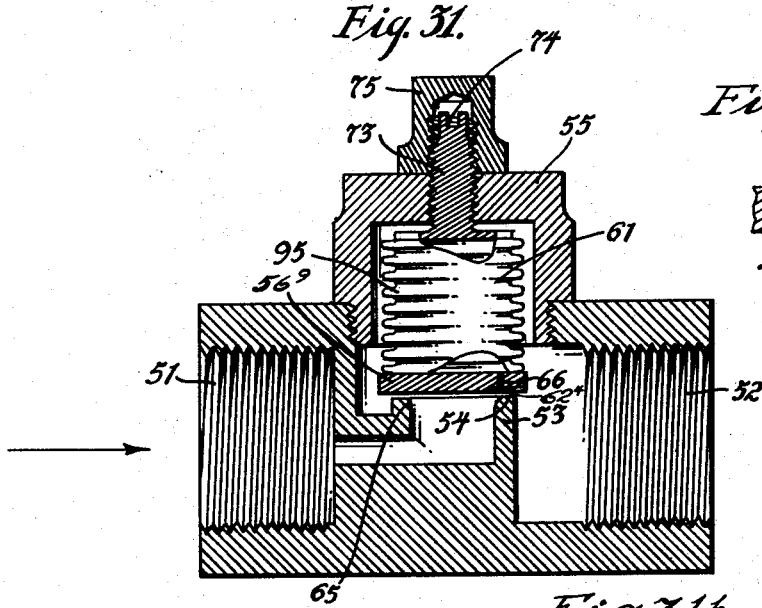
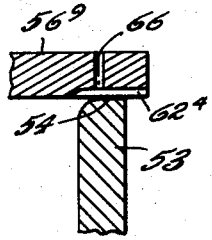
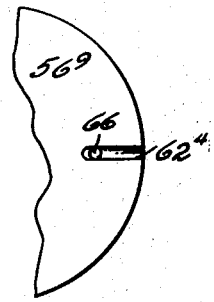
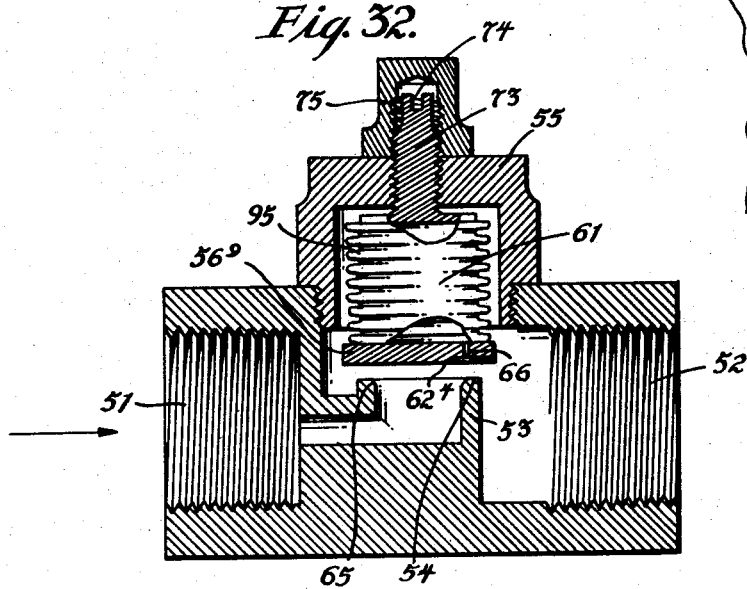
INVENTOR
WALTER J. KINDERMAN
BY
ATTORNEYS

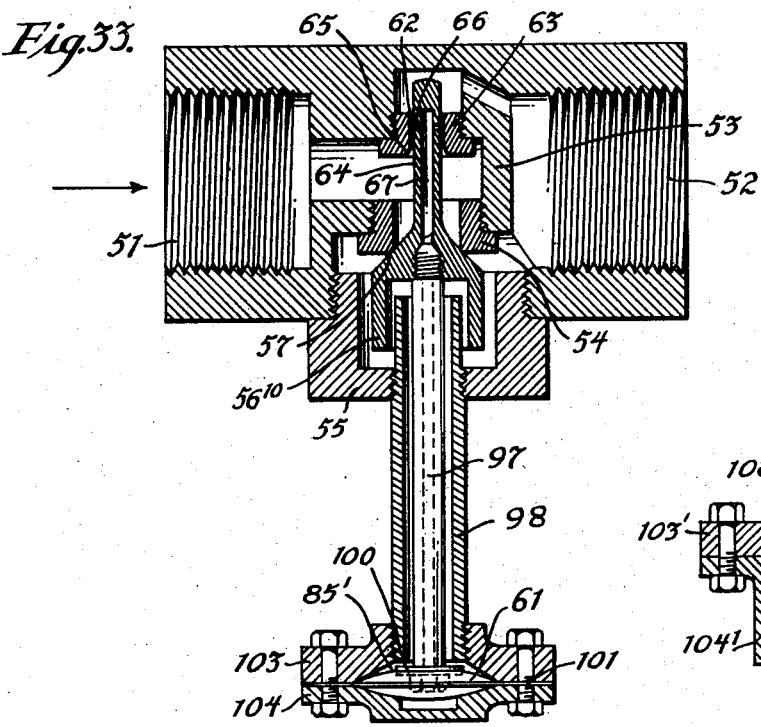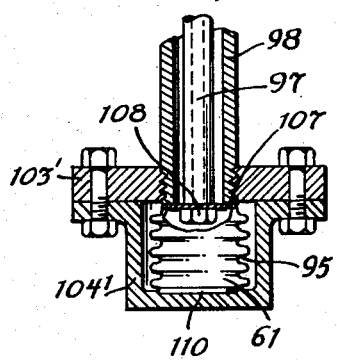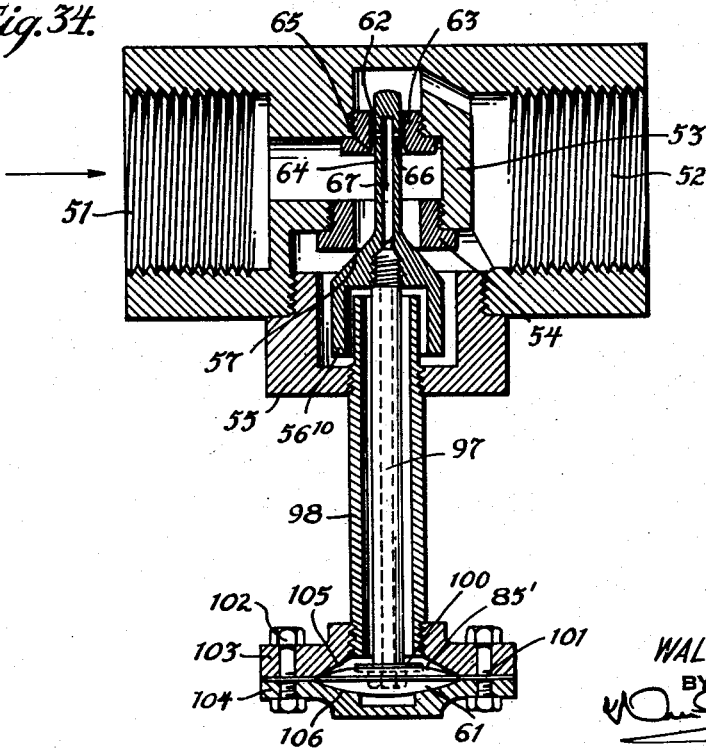

May 17, 1960     W. J. KINDERMAN     2,936,772
STEAM TRAP
Filed Oct. 19, 1953     14 Sheets-Sheet 13
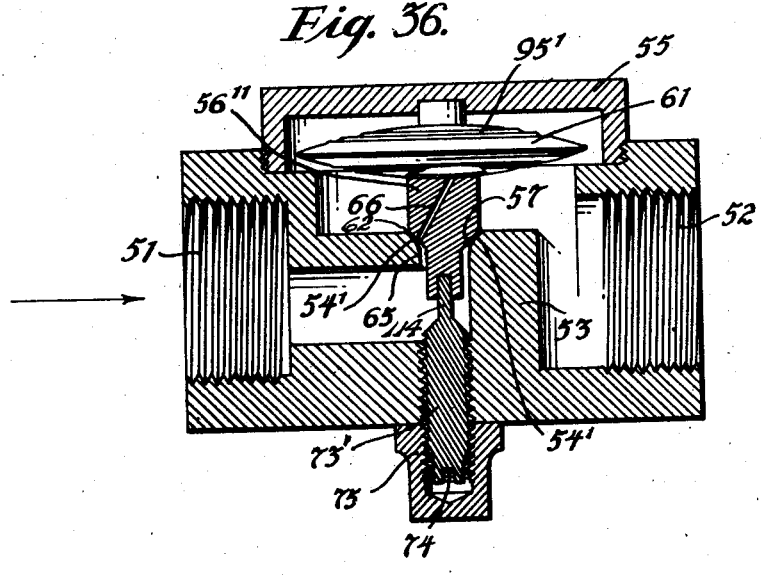
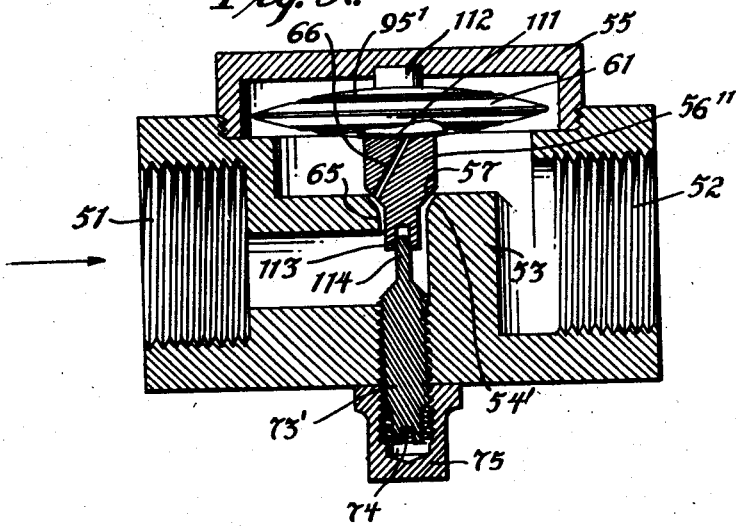
INVENTOR
WALTER J. KINDERMAN
BY
ATTORNEYS

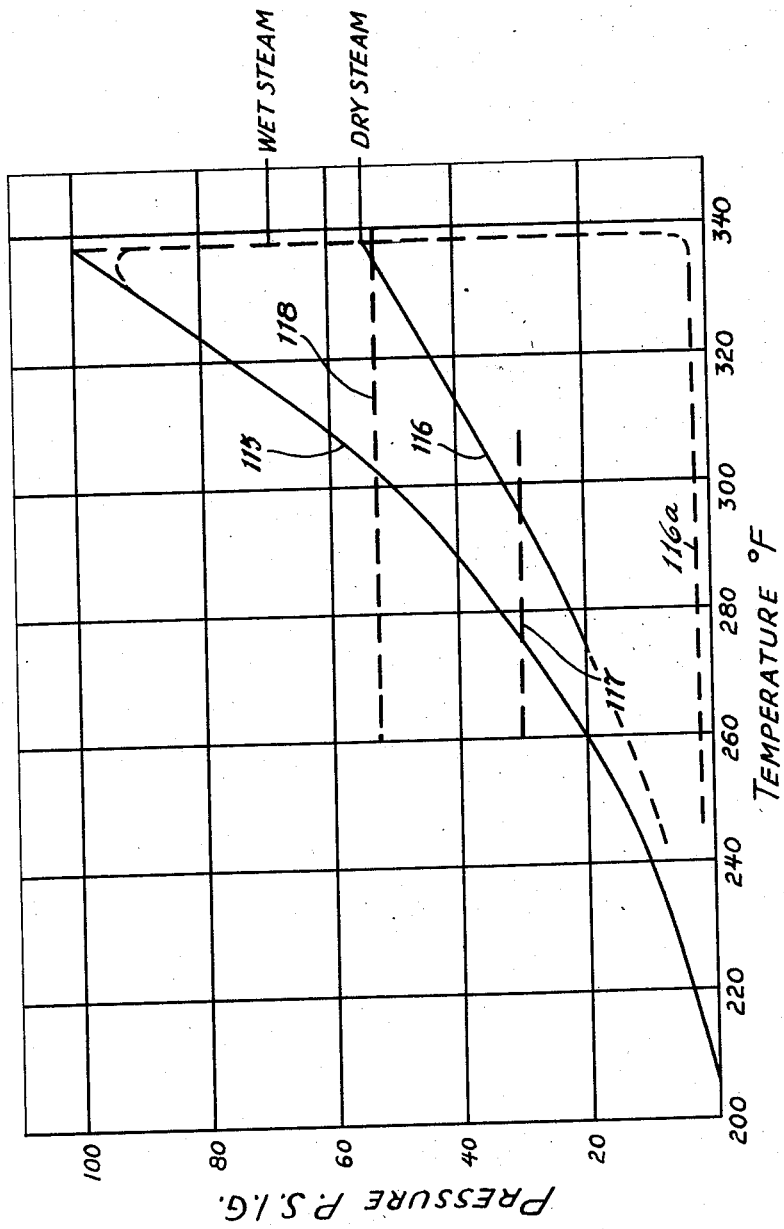

United States Patent Office 2,936,772
Patented May 17, 1960

2,936,772
STEAM TRAP

Walter J. Kinderman, Philadelphia, Pa., assignor to Yarnall-Waring Company, Chestnut Hill, Pa., a corporation of Pennsylvania Application October 19, 1953, Serial No. 386,883
35 Claims. (Cl. 137—183)

The present invention relates to the removal of condensate from a steam space, and especially to steam traps for removal of condensate.

A purpose of the invention is to control the removal of condensate from a steam space in response to the pressure in the throat of a single orifice through which fluid is passing directly from the space to discharge under conditions of streamline flow, and especially with condensate under metastable equilibrium.

A further purpose is to conduct fluid from a space containing steam and condensate through a single orifice under conditions of streamline flow, and to regulate discharge of a main stream from the space in response to pressure at that orifice, as distinguished from the pressure beyond that orifice or between two orifices.

A further purpose is to selectively create conditions of streamline flow and conditions of turbulent flow in an orifice discharging from a space containing steam and condensate, and to control discharge of a main stream in response to the transition from streamline flow to turbulent flow and vice versa.

A further purpose is to control the operation of a steam trap by pressure closer to the temperature for saturated steam under the particular conditions than has been possible heretofore.

A further purpose is to obtain a snap action in steam trap operation in response to pressure controlled by flow through an orifice.

A further purpose is to produce a more economical steam trap.

A further purpose is to make a steam trap respond more quickly to variations in the character of the flow discharge.

A further purpose is to avoid abrupt changes in cross section of the flow stream preceding the orifice and in the orifice so as to avoid the tendency to create thermodynamic equilibrium and thereby prevent flashing of condensate.

A further purpose is to employ a curvature on the entrance surface or mouth of the orifice which will conform as closely as possible to the natural curvature of the flow stream so as to enter the restriction or throat with minimum turbulence. In practice an entrance radius between ½ the throat diameter and throat diameter serves to approximate the requirements for a round orifice.

A further purpose is to employ a control orifice throat length not less than the throat diameter and preferably not greater than ten times the throat diameter.

A further purpose is to bring the curvature of the deflecting surface of the mouth of the orifice into tangency with the throat.

A further purpose is to employ a surface finish on the mouth of the orifice and the throat which is less than 16 micro inches.

A further purpose is to extend the curvature outward to at least two-thirds the radius of curvature.

A further purpose is to create the orifice in the annular space between an orifice ring on the outside and a tailpiece of a main valve on the inside controlling the main stream.

A further purpose is to provide a groove on the tail piece located outside of the orifice when the valve is closed and bring the groove into the orifice when the valve opens to change streamline flow to turbulent flow.

A further purpose is to provide a piston freely moving in a cylinder for the control chamber and to interconnect the orifice with the control chamber by a pressure tap.

A further purpose is to use a resilient wall on the control chamber such as a diaphragm or bellows to operate the valve and connect the interior of the control chamber to the orifice by a pressure tap.

A further purpose is to employ a disc valve forming one wall of the control chamber and to create the orifice by a recess along the disc, while the pressure tap extends transversely to the recess through the disc.

A further purpose is to dispose the control piston so that it will be relatively insensitive to accumulation of dirt from the medium.

A further purpose is to minimize the velocity impingement effects when the main stream trap valve is open.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a vertical longitudinal section of a steam trap of the present invention in closed position, the section being taken on the line 1—1 of Figure 2.

Figure 2 is a vertical transverse section of Figure 1 on the line 2—2.

Figure 3 is a top plan view of the steam trap of Figures 1 and 2.

Figure 4 is a section corresponding to Figure 1, but showing the trap in open position.

Figure 5 is a central longitudinal vertical section of the variant trap in closed position.

Figure 6 is a view corresponding to Figure 5 showing the trap in open position.

Figures 9 to 11 illustrate a still further variant of the steam trap of the invention.

Figure 9 is a central vertical longitudinal section showing the trap in closed position.

Figure 10 is a view corresponding to Figure 9 illustrating the trap in open position.

Figure 11 is an enlarged fragmentary section on the line 11—11 of Figure 9.

A further variant of the trap of the invention is illustrated in Figures 12 to 14 inclusive.

Figure 12 is a central vertical longitudinal section showing the variant trap in closed position.

Figure 13 is a fragmentary enlargement of a portion of Figure 12.

Figure 14 is a section corresponding to Figure 12 showing the trap in open position.

Figures 15 and 16 illustrate a further embodiment of the invention, with minor variations being illustrated in Figures 17 to 17c.

Figure 15 is a central vertical longitudinal section showing the variant steam trap in closed position, while Figure 16 is a similar view showing the trap in open position.

Figures 17 to 17c inclusive are fragmentary enlargements of the orifice of the trap of Figures 15 and 16, with different forms of the pressure tap.

Figure 18:
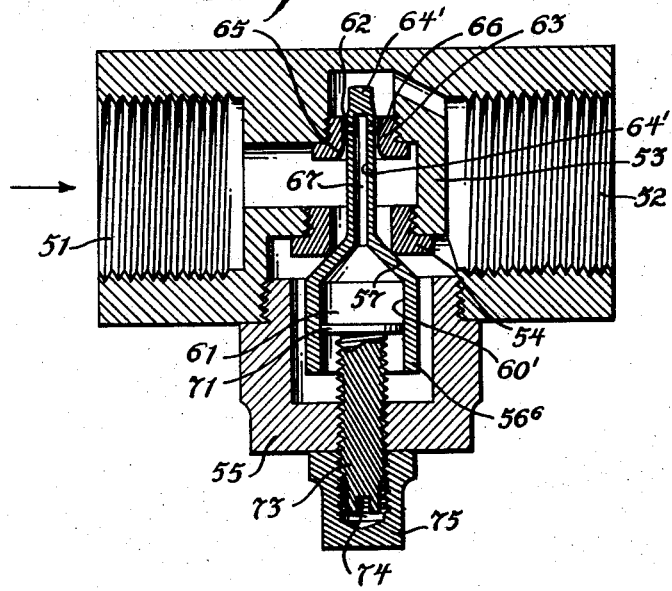
Figure 19:
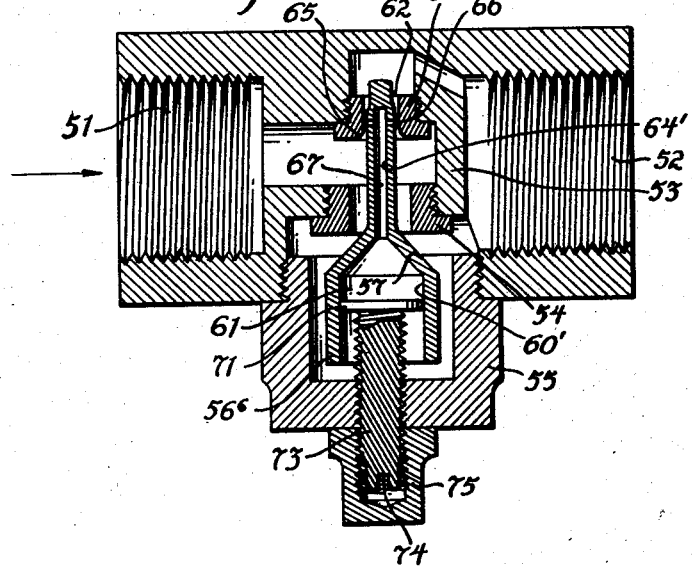

Figures 18 and 19 illustrate another embodiment of the steam trap of the invention, in central vertical longitudinal sections, Figure 18 showing the trap closed and Figure 19 showing the trap open.

Figures 20 to 26 show a further embodiment of the invention.

Figure 20 is a central vertical longitudinal section with the trap closed.

Figure 21 is a fragmentary enlargement of a portion of Figure 20.

Figure 22 is a section corresponding to Figure 20, but with the valve in open position.

Figure 23 is a fragmentary bottom plan view of the valve of Figure 20, with the seat shown in dot-and-dash lines for placement.

Figure 24 is a fragmentary enlarged section of Figure 23 on the line 24—24.

Figure 25 is a fragmentary enlarged section of Figure 23 on the line 25—25.

Figure 26 is a fragmentary enlarged section corresponding to Figure 21 but showing a minor variation.

Figure 27:
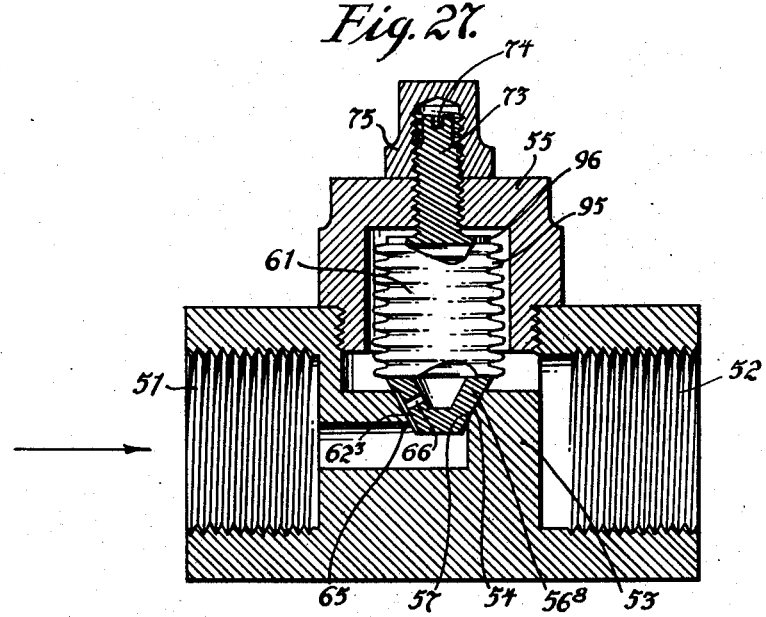
Figure 28:
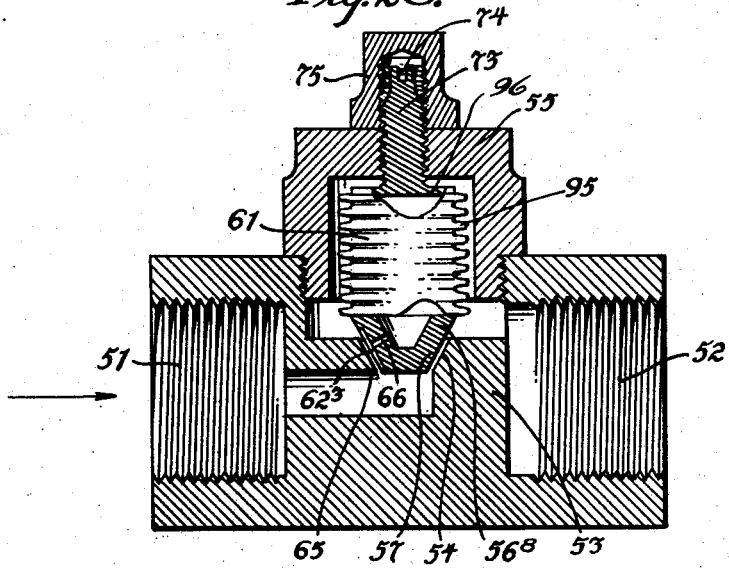

A further embodiment of the invention is shown in Figures 27 and 28 in central vertical longitudinal sections, Figure 27 showing the valve closed and Figure 28 showing the valve open.

Figure 29:
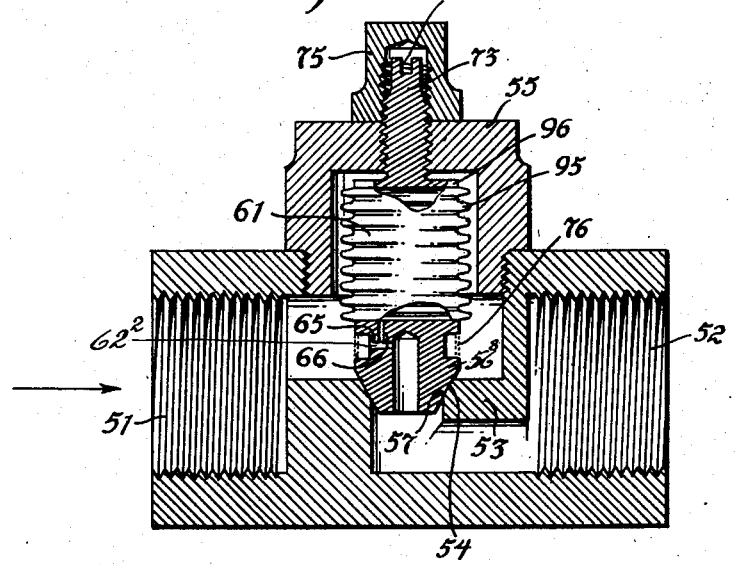
Figure 30:
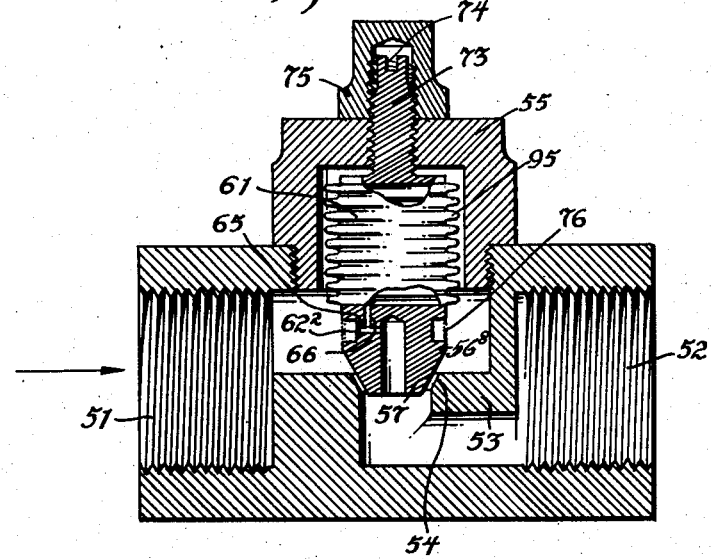

Figures 29 and 30 are central vertical longitudinal sections of a still further embodiment, Figure 29 showing the valve closed and Figure 30 showing the valve open.

Figures 31 and 32 are central vertical longitudinal sections of another form of the steam trap of the invention, the valve being closed in Figure 31 as far as it will close and being open in Figure 32.

Figure 31a is a fragmentary enlargement of Figure 31.

Figure 31b is an enlarged fragmentary bottom plan of the valve of Figure 31.

Figures 33 and 34 are central vertical longitudinal sections of another form of the invention, the steam trap valve being closed in Figure 33 and open in Figure 34.

Figure 35 is a fragmentary section corresponding to Figure 33 showing a further variation.

Figures 36 and 37 illustrate in central vertical longitudinal sections another embodiment of the invention, the valve being closed in Figure 36 and open in Figure 37.

Figure 38 is a curve useful in explaining the invention.

Describing in illustration but not in limitation and referring to the drawings:

Steam traps have been widely used which are operated by the pressure in a control chamber which responds to a characteristic or property of fluid flowing from the trap.

In the most widely used form of such prior art traps, fluid flows through two orifices in series, and the trap is operated by pressure variation between these two orifices. Traps of this character present a problem from the standpoint of manufacture because of the high tolerences required and the expensive materials which must be used, rendering the traps comparatively expensive. It is also not possible in such prior art traps to obtain operation very close to the temperature of saturated steam at the particular pressure.

Efforts have been made also to control the operation of a steam trap by fluid under equilibrium conditions induced by turbulent flow, and controlling through a pressure tap from the turbulently flowing stream, as in Schott, U.S. Patent No. 2,234,387, granted March 11, 1941, for Steam Trap. The control pressure in this case is essentially vapor pressure. This has the disadvantage that the trap discharges at a comparatively low temperature compared with the temperature of saturated steam at the particular pressure. Therefore there is excessive lag in trap operation, and the trap continues with the trap valve remaining closed for a substantial time until the temperature and vapor pressure drop to the value which permits valve lift.

The present invention is designed particularly to produce a comparatively inexpensive steam trap which will operate very close to the temperature of saturated steam at the particular pressure, thus greatly reducing the lag which has existed in the prior art two orifice traps and in the prior art single orifice turbulent flow traps.

In accordance with the present invention, fluid, which may be steam, condensate, or a mixture of vapor and condensate, escapes from the closed space of the trap to the atmosphere or other point of discharge under conditions of streamline flow. Streamline flow is very important in this connection as it permits maintaining a metastable state in the condensate, so that condensate which is under conditions of temperature and pressure which would normally result in flashing of vapor if equilibrium prevailed, nevertheless remains as liquid because surface tension maintains it in a metastable state. Thus in accordance with the present invention the trap responds to the abnormally low pressure conditions in an orifice corresponding to the discharge of condensate, in the metastable state which under equilibrium condition would flash into vapor, but is actually liquid because of the streamline flow.

In order to secure the streamline flow in accordance with the invention, the deflecting surfaces of the mouth of the orifice must conform to special requirements of curvature corresponding to or approximating the natural curvature of the liquid flow stream in conforming to the throat restriction. It will be understood that if the stream is following a straight wall and encounters a shoulder or corner spaced from that wall to form an orifice, the shoulder or corner is the deflecting surface influencing the stream which must be controlled in curvature, and not the straight wall which is free from change in directional influence.

In accordance with the invention, the curvature should be equal to the natural form of the flow of liquid entering a sharp edged orifice and flowing free but in practice an approximate entrance curvature between ½ the orifice diameter and the orifice diameter will result in reasonable approach to the desired benefits. It will of course be understood that if the orifice is not round but of some other configuration, the dimension which controls the curvature is the dimension normal to the wall at which the curvature exits on the side adjoining the orifice, that is, the distance across the orifice.

It is most desirable that the surface curvature at the mouth be a smooth tangent to the throat at the inside of the orifice. This is however less necessary at the outside, and in fact if the curvature extends out from the orifice at the mouth for a distance of two-thirds of the radius, this is sufficient. The zone of demarcation between the forward face of the throat wall and the mouth should be burnished or otherwise rounded to merge with the curvature. It is important also that the orifice in streamline flow be free from circumferential grooves or scratches or other projections which will tend to promote turbulence, and with this end in view the entire orifice including the curved mouth and the throat should be burnished, polished or otherwise finished to obtain a surface finish of less than 16 micro inches.

In order that the conditions in the throat can be effective for control purposes, the generally straight (it is sometimes made slightly diverging) portion of the throat of the orifice should have a length not less than the diameter at the throat. Where the diameter at the throat changes, this should be the minimum diameter. This feature is important for the establishment of critical pressure conditions for steam flow within the restriction of the orifice to insure a sufficiently high control pressure for valve closure. Too short an orifice will permit expansion of the steam beyond the confines of the orifice before critical pressure conditions can be established, thus permitting increased flow and lowering of the throat pressure. It has been found that excessive length of the throat is not desirable and for ordinary purposes there is no advantage in employing a throat more than ten times the diameter.

A pressure tap extends out from the throat generally transverse thereto and communicates with the control chamber to open and close the valve depending upon the conditions of flow in the throat. The angle of the pressure tap while generally transverse will where desired be varied to create changes in flow conditions between complete suppression of vapor pressure effects at the pressure tap and full vapor pressure effects. For example a very narrow slitted opening for the pressure tap with the length of the slit disposed normally to the direction of the stream in the orifice, has a large tap area but has small effect on direction of flow, and so produces minimum disturbances of the flow stream per unit cross-sectional area of tap opening. Likewise by changing the location of the tap opening along the throat or varying the angle of the pressure tap with respect to the stream (while keeping the pressure tap generally transverse) varying amounts of vapor suppression will be obtained as desired.

In accordance with the invention, a snap action in opening and closing of the trap valve is obtained which is not obtained with control by pressure between two orifices and is not obtained by control through turbulent flow through one orifice.

Considering first the form of Figures 1 to 4, the steam trap casing 50 has an inlet 51 suitably threaded or otherwise constructed to connect with piping and an outlet 52 likewise suitable threaded or otherwise provided for connection to piping. Between the inlet and outlet extends a cross wall 53 which has a main valve seat 54 preferably disposed with its axis vertical. In the form of Figures 1 to 4, and in a number of other forms, the main valve seat 54 is removable and threaded in the wall 53, whereas in other forms the main valve 54 is formed directly in the wall 53, either procedure being used where desired. Suitable passages are provided to connect the main valve seat with the inlet and outlet in the different forms.

A bonnet 55 is threaded into an opening suitably at the top or bottom of the casing axially in line with the main valve seat, and the bonnet housing the control chamber in the various forms being shaped as required in each embodiment. The bonnet is suitably of hexagonal or of other configuration to take a wrench or other tool for removing and tightening the bonnet.

In the form of Figures 1 to 4, valve 56 occupies the space inside the bonnet and cooperates with the valve seat to open and close a main stream of fluid flowing through the valve when the valve is open. In the form of Figures 1 to 4, the valve has a suitable conical surface 57 which engages the valve seat when the valve is closed. At its end remote from the valve seat and inside the bonnet, the valve is outwardly flanged to form a piston 58 which makes a free sliding fit on the inside of cylinder 60 in the bonnet.

The space inside the cylinder 60 between the end of the cylinder and the piston 58 forms a control chamber 61 which regulates the valve operation in response to pressure variations.

Wholly separate from the valve and valve seat in the form of Figures 1 to 4, a single control orifice 62 communicates directly from the inlet to the outlet and passes a continuous stream of fluid. The control orifice 62 in this form is provided between an orifice ring 63 which is desirably mounted as by threading in the cross wall 53 in line with the axis of the valve and tail piece 64 extending axially from the valve through the opening in the valve seat and through the orifice ring 63. Thus the orifice is annular in shape. The deflecting surface of the orifice in the present instance is the shoulder of the orifice ring 63 and this is filleted or annularly curved at 65 around the approach corner so as to favor streamline flow, the curvature being on a radius between half the diameter and the diameter of the throat, in this case the radial dimension of the ring orifice. The length of the throat of the orifice is also between the diameter and ten times the diameter in this form.

Suitable passages are provided from the inlet to the orifice and from the orifice to the outlet.

Transversely to the direction of the stream flow through the orifice pressure taps 66 extend in this case radially inwardly and communicate with the control chamber, in this instance through a passage 67 in the stem and a passage 68 in the valve beyond the main seat. The pressure tap should have a diameter not exceeding the throat diameter.

The tail piece extends beyond the orifice on the inlet side in closed position of the valve and suitably annular grooves 70 are provided which are brought into the orifice when the valve opens as shown in Figure 4.

These grooves tend to create turbulence when the valve opens and change from flow in metastable liquid equilibrium, favoring closing of the valve and overcoming any impact effect from the stream in holding the valve open. This avoids the necessity of using a reverse taper on the control chamber, as has sometimes been employed.

Thus it will be seen that in the form of Figures 1 to 4 the control orifice is in the center around the tail piece, and the control orifice continuously discharges fluid, while the control tapping at right angles to the stream communicates the throat pressure to the control chamber.

When condensate of relatively low temperature is flowing through the control orifice, a low pressure is maintained in the pressure tap 66, lowering the pressure in the control chamber, as compared with the pressure acting on the piston from the inlet, since the control chamber is exposed to the pressure in the steam space. The valve then opens and discharges the main stream of condensate through the space between the main valve and main valve seat.

When the temperature of condensate rises close to the temperature for saturated steam or when steam passes through the control orifice 62, pressure in the pressure tap rises and increases the pressure in the control chamber, causing the valve to close. This closure is aided by the effect of the grooves 70 which are brought into the orifice in open position of the valve creating a condition favorable to closing by causing metastable condensate to flash. Thus a positive response is secured to close the valve. This overcomes the effect of pressure beneath the valve seat in maintaining the valve open. Of course when the valve is closed the tail piece grooves are not in the path of the flow through the orifice and the condensate flowing through the orifice tends to remain in metastable state and flashing is suppressed.

In the form of Figures 1 to 4 there is inevitably some leakage between the piston 58 and the cylinder 60. This leakage is small and by the construction of the invention is likely to be outward due to higher control chamber pressure especially when the valve is closed. This has a tendency to prevent an accumulation of dirt around the wall of cylinder 60 which might clog the construction. The location of the piston 58 at the top is also advantageous to prevent dirt from entering, although the valve will work with the piston at any angle.

Figure 5:
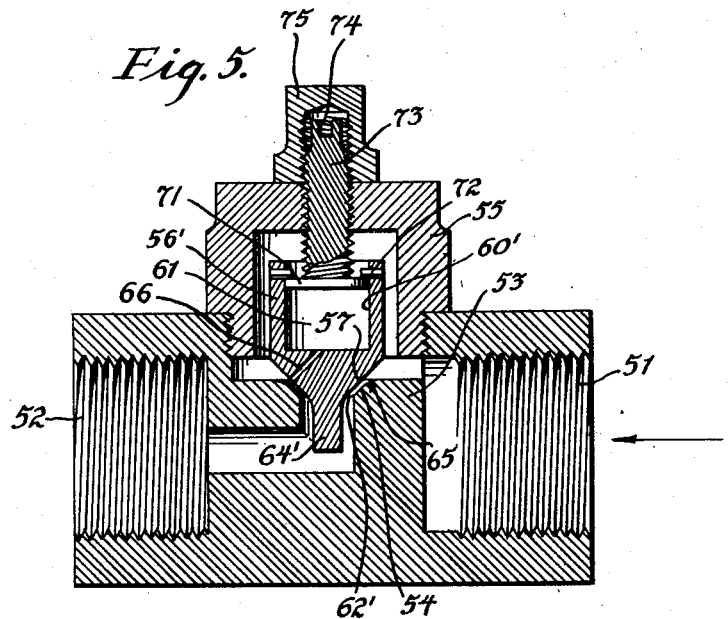
Figures 5 and 6 illustrate a variant of the steam trap of the invention.
Figure 6:
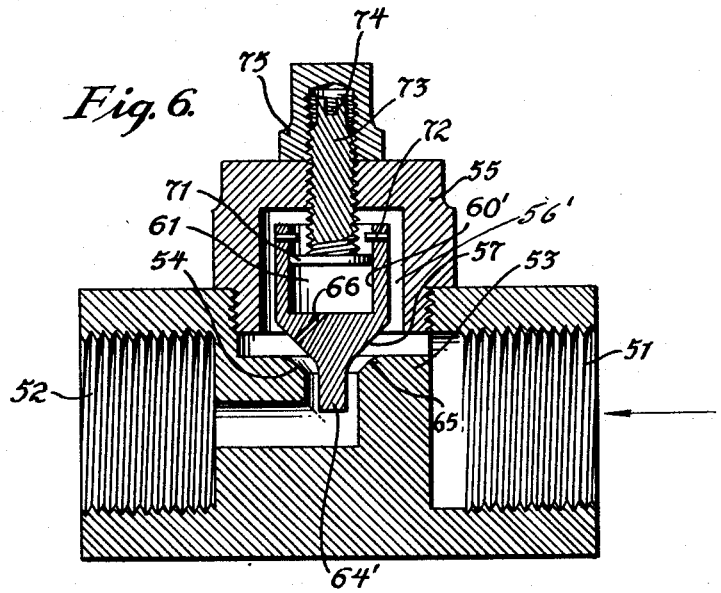

In some instances the features of the present invention are desirably obtained by employing an orifice which is in effect the main valve opening when the main valve is only partially open. This is illustrated in the form of Figures 5 and 6. In this form the valve 56' has a hollow interior coaxially with the valve and forms a cylinder 60'. There is a tail piece 64' extending from the valve through the seat. The streamlining at 65 is here provided on the inlet edge of the seat, which in this case is the upper edge since the inlet 51 is at the right hand end.

A piston 71 coaxial with the valve makes a free sliding fit in the cylinder 60'. The piston engages stops 72 extending radially inward from the valve on the side of the piston remote from the seat, preventing the valve from fully closing so as to create a constantly open orifice 62' between the main valve and the seat in the position nearest to closing (never fully closed) which the valve attains. The orifice is thus a conical ring and the streamlining of the deflecting surfaces at the inlet mouth of the orifice conforms to the requirements for streamline flow as above set forth, the length of the orifice likewise conforming to the dimensions suggested above.

In order to adjust the orifice, the piston 71 is mounted on a threaded shank 73 threaded through the bonnet 55 and having a screw driver notch 74 at the outer end for adjustment. To prevent tampering and hold the adjustment the shank is covered by a cap nut 75.

The pressure tap 66 in the form of Figures 5 and 6 extends through the valve transversely to the flow of the stream and communicates with the control chamber 61 on the inside of the valve.

In operation in the form of Figures 5 and 6, the streamline flow with metastable state occurs between the main valve and the seat in the almost-closed position of Figure 5, and when the temperature of the condensate is low enough so as to maintain reduced pressure in the control chamber the valve opens as shown in Figure 6. When the temperature is close to the temperature of saturated steam in the orifice, or when saturated steam appears in the orifice the valve almost closes to the position of Figure 5 and streamline flow continues through the orifice until the temperature of the fluid passing through the orifice drops low enough to cause the valve to open.

Figure 7:
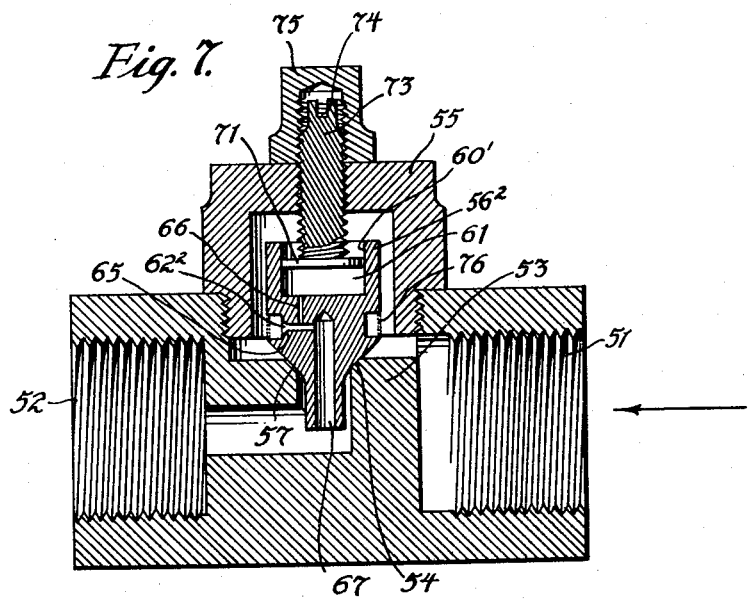
Figures 7 and 8 illustrate a further variant of the trap of the invention in central vertical longitudinal sections, Figure 7 being in closed position and Figure 8 in open position.
Figure 8:
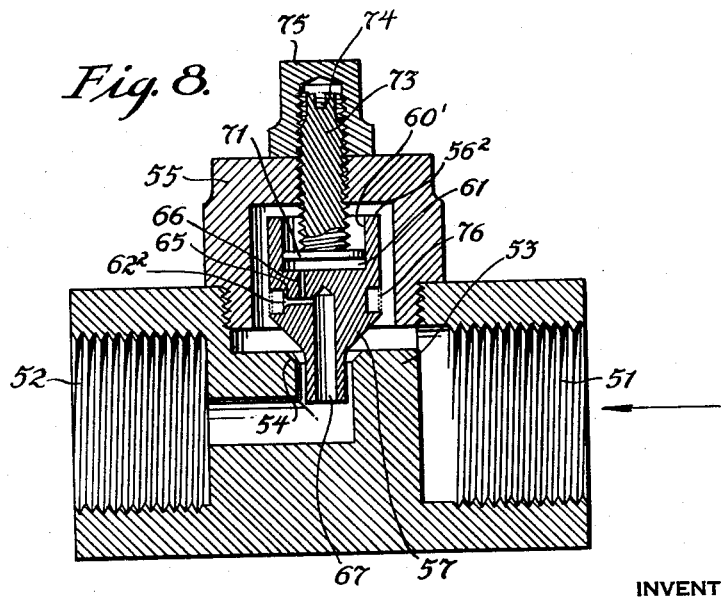

It is preferable to use a wholly separate orifice from the main valve passage, as shown in the form of Figures 7 and 8. In this form the cylinder 60' is constructed in the valve beyond the seat, and the orifice $62^2$ extends radially inward through the valve $56^2$ to a central passage 67 through the valve and tail piece connected to the outlet. The pressure tap 66 is transverse to the orifice as in the other forms and extends through the valve into the control chamber 61. An annular screen 76 suitably of wire mesh surrounds the inlet to the orifice $62^2$. A suitable slot around the valve inside the strainer permits fluid to distribute to the orifice $62^2$. The valve $56^2$ of Figures 7 and 8 resembles that of Figures 5 and 6 except for the location of the orifice, the provision of the strainer and the omission of the stops. This valve operates substantially the same as that of Figures 5 and 6 except that it is capable of fully closing. The position of the piston 71 is adjustable.

In some cases it is desirable to form the orifice in one or the other of the mating surfaces of the main valve and valve seat. In the form of Figures 9 and 10 the orifice $62^3$ is a slot or groove along the conical face 57 of the valve $56^3$, the valve resembling the construction of Figures 1 to 4 without the extended tail piece. The valve is incapable of fully closing, since in the position of Figure 9 there is alway leakage through the orifice $62^3$. The seat is streamlined at 65 so as to permit streamline flow.

This form operates similarily to that of Figures 5 and 6, the pressure tap 66 extending transversely from the groove to the interior of the valve.

In the form of Figures 12 to 14 inclusive the seat 54 is placed off center at the outlet side of the cylinder 60, and the valve $56^4$ is a disc having the orifice $62^4$ in the form of a slot from the inlet to the outlet side of the disc across the seat. The slot is streamlined as is also the valve seat at 65. The pressure tap 66 extends transversely to the slot through the disc to the pressure chamber 61'.

The disc closely but freely fits the cylinder 60 and responds to the pressure in the control chamber. The control orifice in this case is a shallow circular recess at the center under the disc, cooperating with the adjacent portion of the seat, and the disc is free to turn without changing the response to vapor conditions in the medium flowing through the orifice.

The clearance between the disc and the cylinder permits some unavoidable leakage, but with reasonable fit this is a minor consideration, the control being in response to the pressure tap from the flow stream through the single orifice.

The control orifice will desirably be placed symmetrically around a tap tube as shown in the form of Figures 15 and 16. In this form a cylindrical valve $56^5$ is provided with a strainer at 76' extending clear around the valve at a point between the conical surface 57 and the piston 58. Transverse openings 77 behind the strainer extend into a central bore 64', which has a streamlined approach annular curved surfaces 65 in a shoulder portion 78 at the center. A tap tube 80 is mounted in a tubular nut 81 threaded in the top of the valve, and the tap tube extends in spaced relation into the bore 64' to form a control orifice 62 around the bore.

In the preferred embodiment of Figures 15 and 16, the tap tube has pressure tap openings 66 extending radially inwardly into the bore 82 on the inside of the tap tube, and is closed at the bottom end. The tap tube is open at the top.

Various forms of construction of the tap tube may be used as shown in Figures 17 to 17c. In Figure 17 the lower closed end of the tap tube is rounded at 83 instead of being conical as at 84 in Figures 15 and 16.

The forms of Figures 17a to 17c have the advantage of reducing machining costs. In the form of Figure 17a the tap tube is open and has axial V notches 66' extending from the lower end toward the upper end and located below the entrance to the control orifice. In the form of Figure 17b the tap tube 81 is constricted at 84 near the lower end to form a tap opening $66^2$ at the center near the bottom inside the orifice.

In the form of Figure 17c the tap tube has a bottom end closed as at 83 in Figure 17 and has a side slot $66^3$ in the throat of the control orifice to act as a tap opening.

The operation of this device is similar to that of the earlier forms described.

In some cases the mechanism is desirably inverted, as for example to minimize the danger of difficulty from dirt, which otherwise might obstruct the tap opening. The form of Figures 18 and 19 is designed in this way, bearing a resemblance to Figures 1 to 4 and also Figures 5 and 6.

In this case a valve $56^6$ is somewhat of the type shown in Figures 5 and 6, but without the limiters 72. The control orifice 62 is located between the orifice ring 63 and the tail piece 64' which extends up through the orifice ring. The tap openings 66 extend radially in and connect with the bore 67 which communicates with the chamber 61 which receives piston 71 adjustably mounted as in Figures 5 and 6. The piston has free clearance from the wall of the cylinder 60' inside the valve.

The invention is also applicable to forms in which the control chamber is connected to the valve by a flexible wall such as a diaphragm or bellows. This is illustrated in the form of Figures 20 to 25 inclusive, which is a modification of the form of Figures 12 to 14 inclusive. In this form a disc valve $56^7$ cooperates with a seat 54 and has a control orifice $62^4$ in this case located off center with respect to the axis and comprising a slot extending radially along the bottom edge of the disc across the seat 54. The control pressure tap 66 extends transversely through the valve $56^7$ into the space above the valve inside the bonnet 55. The valve in this case is sealed to the bonnet by a flexible diaphragm 85 which is conveniently anchored annularly at the outside at 86 by being screwed between the bonnet and the bonnet seat, being held down by a washer 87 sealed by an O-ring 88.

On the inside the diaphragm is conveniently anchored in the form of Figures 20 to 25 by a jam washer 90 engaging an O-ring 91 at the inside and held in place by a nut 92 threaded on a tubular upper extension 93 of the valve.

If desired the diaphragm 85 can be held in the center by a washer 91' gripped by a spun over rim 94 of the annular upward extension 93' from the valve.

The diaphragm is flexible, and preferably heat resisting. An example of a suitable material is fiber glass cloth coated with polytetrafluorethylene (Teflon) or a heat resisting synthetic rubber. This form has the advantage that there is no leakage from the control chamber around the disc. The control orifice in this form can be made very small indeed to give the smallest control flow consistent with good results.

The invention is applicable to bellows forms instead of diaphragms. Figures 27 and 28 illustrate such a construction, which resembles that of Figures 9 and 10 except that flow is in the opposite direction and a bellows is employed. In this case a bellows 95, suitably of the beryllium copper or stainless steel type, is coaxially mounted on a support 96 which is adjustably threaded through the bonnet as in the construction of Figures 5 and 6. At the other end the bellows mounts the valve $56^8$ which is of the tapered circular character and has a control orifice slot $62^3$ and a tap opening 66 transversely thereto extending to the bellows interior.

The operation of this form is similar to that of Figures 20 to 25, and resembles that of Figures 9 to 11.

The form of Figures 27 and 28 may be modified to conform to that of Figures 7 and 8 as shown in Figures 29 and 30, the construction, however, being reversed as to direction of flow. In this case the control orifice, pressure tap opening and strainer are as in Figures 7 and 8, and the control chamber is effectively inside the bellows 95.

The invention may also be applied to a disc type of valve mounted on a bellows, as shown in Figures 31 and 32. In this form there is a control orifice $62^4$ similar to that used in Figures 20 to 25, which extends radially through the disc across the seat, and the control pressure tap 66 extends transversely thereto into the interior of the bellows 95. The bellows mounts the valve $56^9$ as in the form of Figures 27 and 28.

In this form as in all others in which the orifice is located radially between the valve and the seat, the orifice does not diverge and preferably converges with approach to the outer edge to a degree which will provide uniform cross section of the flow stream as it moves radially outwardly.

Where the diaphragm is incapable of standing up under the steam temperatures, it is preferable to use the diaphragm form of Figures 33 and 34. In this case the valve $56^{10}$ resembles that of Figures 1 to 4 but is inverted, and the bore 67 is extended downwardly by threading a tube 97 into the valve and extending the tube inside a bonnet extension 98 to interconnect annularly at 100 with the inside of a diaphragm 85' whose outside is clamped at 101 by bolts 102 between a diaphragm housing 103 on the bonnet extension 98 and a diaphragm housing cap 104. To provide support for the diaphragm in its extreme limiting positions, the diaphragm housing and cap are respectively annulardly arcuately curved at 105 and 106. The tube 97 has a bore open at both ends.

In the form of Figures 33 and 34, the passages around the tube 97 and above the diaphragm 85' will normally become flooded with condensate and thus tend to maintain the diaphragm cool so that it will not be deteriorated by exposure to steam temperature. When there is danger of freezing, the form of Figures 33 and 34 is not as desirable as the forms of Figures 20 to 25 inclusive, although the form of Figures 20 to 25 inclusive exposes the diaphragm to prolonged exposure to steam.

It will be evident that if pressure differentials are obtained which might rupture the diaphragm, the diaphragm before rupture is engaged on and supported by the surface 105 and 106.

The structure of Figures 33 and 34 may be employed with a bellows 95, which is secured to the lower end of tube 97 by anchorage 107 fastened by nut 108 to the tube 97 and anchorage 110 at the other end of the bellows fastened as by welding to cap 104' on casing 103' secured to the bonnet extension 98.

The device of Figure 35 operates similarly to that of Figures 33 and 34.

The invention may be employed also with a double bellows 95' as shown in the form of Figures 36 and 37. In this form the valve $56^{11}$ has a conical sealing surface as in the form of Figures 1 to 4 and the seat 54' has curved approach surfaces 65 on the lower portion. The control pressure tap 66 is transverse to the conical surface of the valve and communicates with the interior of the bellows 95', one side of the bellows at the center being secured to the valve at 111 and the other side secured to the bonnet near the center of the bellows at 112. The valve on the lower end has a central circular opening 113 which receives a guiding limiter 114 which is mounted on a threaded plug 73' adjusted as in the form of Figures 5 and 6.

In operation of the form of Figures 36 and 37, the limiter is adjusted so that it prevents the valve from fully closing as shown in Figure 36, thus providing the constantly open orifice 62 between the valve and the seat.

In the above description a number of different embodiments of the invention have been illustrated, but it will be understood that numerous other forms embodying the principles of the invention can be produced as desired.

The device of the invention differs fundamentally in operation from the prior art as embodied for example in Schott U.S. Patent No. 2,234,387 above referred to. Schott employs an abrupt change in cross-sectional area of his main flow stream where control pressure takeoff occurs. This favors thermodynamic equilibrium. Schott describes this at page 2, column 1, line 5, where he says "the pressure created . . . being substantially the saturation pressure." A similar statement appears at page 3, column 2, lines 5 to 12.

Schott employs an abrupt edge which forms one of the walls of the orifice, with a sharp shoulder promoting turbulence and thus equilibrium. Thus Schott uses hot condensate flow conditions through the restricted passage such that when the pressure along the flow stream drops to vapor pressure, flashing occurs which maintains the pressure at the control pressure tap location at the vapor pressure level. Schott employs radially outward flow between parallel surfaces which locates the orifice throat or restriction at the sharp entrance and provides for a divergent condition as the flow continues outward. This construction creates the greatest velocity head and suppression of pressure head at the inner entrance and is most favorable to immediate establishment of thermodynamic equilibrium of the fluid as indicated by Schott.

In the device of the present invention, however, there are gradual streamlined acceleration of the fluid to the maximum throat velocity and minimum interference with the flow stream so that hot condensate does not flash at equilibrium but tends to remain liquid in a metastable condition until it passes through the orifice. This results in tap pressures which are considerably below the vapor pressure for thermodynamic equilibrium. Thus it is possible to get lower control pressures on the condensate at all temperatures up to saturation as compared with the control pressures on steam.

Obviously, in the device of the invention, the preferred direction of flow is opposite to that employed by Schott, unless the flow path is specially formed to meet the streamline requirement as indicated in the several forms shown.

Figure 38 compares the typical conditions for tap operation for the Schott device in comparison with the device of the invention.

This plots as the ordinate the pressure of the fluid discharging in p.s.i.g. against the temperature in degrees Fahrenheit.

Curve 115 is the vapor pressure curve corresponding to the control pressure for the Schott device, and curve 116 is the typical control pressure curve for the device of the invention proportioned for example as in the form of Schott Figures 1 and 2, but constructed to conform with applicant's device illustrated for example in Figures 12 to 14. The control pressure curves in Figure 38 are based on initial pressure on the control elements at 100 p.s.i.g.

If it be assumed that the valve of Schott Figure 1 is initially in the closed position and operating on saturated condensate at 100 p.s.i.g. pressure at the inlet, the vapor pressure in the control chamber to permit the valve to lift for discharge may be calculated. Since the ratio of the valve seat diameter to the piston diameter is about 6 to 11, the conditions for valve balance (assuming zero discharge pressure) may be written as:

$$6^2 P_1 = 11^2 P_v$$

Where $P_1$ is the initial pressure
$P_2$ is the chamber pressure for balance of the valve
$P_2$ in turn is equal to $P_v$, the vapor pressure of the flowing condensate. If we solve this equation we find that $P_v = 0.336 P_1$
Then if $P_1$ is 100 p.s.i.g., $P_v = 33.6$ p.s.i.g.

Upon referring to the steam tables, we find the saturation temperature for 33.6 p.s.i.g. is 279° F. which is the temperature for valve lift. This is 59° F. below steam temperature and is too low for many drainage requirements. Under similar design conditions experimental measurements indicate that the device of the invention discharges at a temperature of 296° F. which is only 42° F. below steam temperature.

Line 117 on Figure 38 shows the approximate chamber pressure for valve balance in the form of Schott Figure 1.

If a similar comparison is made for the form of Schott Figures 5 and 6, it will be found that in the Schott device valve lift is promoted when the control pressure drops to approximately 55% of the initial pressure. In this case, assuming 100 p.s.i.g. initial pressure, the Schott valve opens on condensate when the temperature drops to 302° F. or 36° below steam temperature. On the other hand, the device of the invention when similarly proportioned will discharge practically at steam temperature. In Figure 38 the line for chamber pressure for valve balance in Schott Figures 5 and 6 is illustrated in 118.

It should be noted that the margin of closing on steam in both cases is quite narrow and represents the limiting condition for trap operation in the device of the invention. Thus the device of the invention is capable of opening on condensate practically up to steam temperature while the Schott device is limited to opening on condensate at approximately 36° below steam temperature with an initial pressure of 100 p.s.i.g.

The above analysis is based upon the assumption that the valve of the invention is initially in the closed position with hot condensate flowing through a constricted passage. It should be realized that once the valve is open, the flow reaction on the valve will keep the valve open to considerably higher condensate temperatures, possibly up to steam temperature, and may cause independent continuation of operation on change of phase between condensate and steam. In practice, however, condensate flow will at least intermittently become established with the valve in the closed position and the difference in control pressure between the Schott device and the device of the invention results in a marked difference in performance, particularly if throttled flow becomes established. Thus it will be evident that according to the invention the device opens and closes much closer to saturated steam temperature than the devices of the prior art.

In the deice of the invention the streamlining reduces turbulence so that flashing is far below the vapor pressure of the fluid, thus favoring trap operation.

By minimizing minute pressure fluctuations within the constricted stream due to turbulence, the liquid phase in the device of the invention remains in metastable condition to sub-vapor pressure levels necessary to overcome surface tension forces which oppose initiation of change of phase, thus permitting desirable low control pressure. The device of the invention stabilizes the liquid phase at the control point along the restricted flow passage at pressures well below vapor pressure of the fluid to develop most favorable control pressure differential between the sub-saturated and the saturated liquid phase on the one hand, and the vapor or gaseous phase on the other hand.

It should be realized in addition that the comparative advantages in performance are based on actual tests and that a closer approach to theoretical conditions will result in even greater advantages. If perfect metastability is realized with improved orifice form, with total suppression of flashing of the hot condensate, the tap pressure will approach the down-stream pressure, thus permitting valve lift and discharge for all condensate conditions. Steam on the other hand will develop the critical pressure (between 50 and 60% of the initial absolute pressure) and will, therefore, provide a wide margin for valve closure. It is expected that these further optimum advantages will be more closely realized with closer attention to improved orifice form and surface smoothness. The lower dotted line 116 of Figure 38 shows this theoretically attainable limit.

The device of the invention permits maximum control pressures on vapor and lower control pressures on all conditions of liquid. The device of the Schott patent however develops highest control pressure in condensate at near the steam temperature and a lower control pressure for sub-cooled condensate and for steam. Thus the Schott device at 100 p.s.i.g. operates at 306° F. which is 32° below the steam temperature and is the highest opening temperature on condensate which is consistent with closing on steam. The Schott device will not open on condensate until well below the steam temperature. The reversal of flow in the device of the present inventor as compared with the Schott patent device has the following advantages:

(1) In the piston device flow is always toward the main stream, so that there is little possibility of clogging by dirt.

(2) Leakage around the piston is above the main flow stream, so as to protect from dirt.

(3) Control flow into the main stream is more favorable to maintenance of streamlined flow.

(4) The proportions of the parts are more favorable to a balanced design.

(5) Converging flow of the main stream favors streamlined conditions in the orifice.

(6) Streamlining of the orifice is easier.

(7) In some forms the device self drains and is less likely to encounter difficulty through freezing.

(8) The velocity impingement effect with the valve open is small.

In view of my invention and disclosure variations and modifications to meet individual whim or particular need will doubtless become evident to others skilled in the art, to obtain all or part of the benefits of my invention without copying the method and apparatus shown, and I, therefore, claim all such insofar as they fall within the reasonable spirit and scope of my claims.

Having thus described my invention what I claim as new and desire to secure by Letters Patent is:

1. In a steam trap, an inlet, an outlet, a valve having a seat between the inlet and the outlet and a valve element cooperating therewith to cut off discharge of a main stream from the trap except for leakage through the orifice mentioned below, a control chamber having a movable wall operatively connected to the valve element and movable in response to the pressure differential on opposite sides of the movable wall of the control chamber, communicating means connecting the inlet to the outside of the movable wall, a single control orifice directly connecting the inlet to the outlet and having a curved streamlined mouth promoting streamline flow in said orifice, and a control pressure tap extending from the orifice transversely to the length of said orifice and connecting with the inside of said control chamber.

2. A steam trap of claim 1, in combination with a tail piece on the valve element, the orifice being located around the tail piece.

3. A steam trap of claim 1, in combination with a tail piece on the valve element, the orifice being located around the tail piece, and grooves across the direction of flow positioned on the tail piece and carried into the orifice when the valve element is in open position.

4. A steam trap of claim 1, in which a piston on the valve element forms the movable wall of the control chamber, the control pressure tap extends into the valve element and communicates with the control chamber from the valve element, and leakage between the piston and the cylinder discharges into the inlet.

5. A steam trap of claim 1, in combination with stop means which limits the valve element against fully closing, the orifice being provided between the valve element and the seat in open position.

6. A steam trap of claim 1, in combination with a cylinder mounted on the valve element, a piston in the cylinder cooperating therewith to form the control chamber and mounted on the trap, and stop means on the valve cooperating with the piston to prevent the valve element from fully closing against the seat.

7. A steam trap of claim 1, in which the orifice extends through the valve element.

8. A steam trap of claim 1, in which the orifice extends through the valve element, in combination with a strainer on the valve element over the orifice.

9. A steam trap of claim 1, in which the orifice extends through the valve element, in combination with a control cylinder within the valve element, a piston cooperating with the control cylinder and together with the control cylinder forming the control chamber, and a support for the piston.

10. A steam trap of claim 1, in which the orifice is formed by a slot in the valve element and the curved mouth for streamlining is provided on the valve seat.

11. A steam trap of claim 1, in combination with a piston positioned on the valve and forming the movable wall of the control chamber, a groove in the valve forming the orifice and a curved mouth on the valve seat promoting streamlining.

12. A steam trap of claim 1, in which the valve is a disc, a groove in the disc forms the orifice and cooperates with the valve seat, and the control pressure tap is an opening in the disc.

13. A steam trap of claim 1, in which the valve seat is positioned off-center in a cylinder, the valve is a disc, cooperating with the cylinder to form the control chamber, a groove is formed in the disc at the center cooperating with the valve seat, and an opening through the disc at the center forms the control pressure tap.

14. A steam trap of claim 1, in which the valve has a center bore communicating with the inlet at one side and the outlet at the other side, a tube in fixed relation to the bore extends through the bore and forms the orifice between the tube and the bore, and an opening from the orifice laterally into the interior of the tube forms the control pressure tap, the interior of the tube communicating with the interior of the control chamber.

15. A steam trap of claim 1, in which the valve has a cylinder centrally disposed therein, a fixed piston makes a sliding fit with the cylinder and forms the control chamber, a tail piece is mounted on the valve and has a hollow interior, an orifice ring is placed around the tail piece, forming the orifice between the tail piece and the orifice ring, and the control pressure tap extends through the tail piece and communicates with the interior of the control chamber through the hollow interior of the tail piece.

16. A steam trap of claim 1, in which a groove is formed in one of the cooperating faces between the valve element and the seat to form the orifice, a flexible wall is provided on one wall of the control chamber to form the movable wall, and the valve element is operatively mounted on the flexible wall, the control pressure tap passing through the valve element into the interior and communicating through the interior to the control chamber.

17. A steam trap of claim 1, in which the valve element is a disc, a flexible wall forms one wall of the control chamber and is interconnected with the disc, a groove in the cooperating surfaces between the disc and the valve seat forms the orifice, and the control pressure tap extends through the disc into the control chamber transversely to the orifice.

18. A steam trap of claim 1, in which the orifice extends through the valve element from the space between the valve element and the valve seat, the control pressure tap extends generally transversely to the orifice, a flexible wall forms parts of the control chamber and the valve element is mounted on and movable with the flexible wall.

19. A steam trap of claim 1, in which the movable wall of the control chamber is a flexible diaphragm, in combination with walls engaging the diaphragm in one of its limited positions and supporting the same.

20. A steam trap of claim 1, in which the valve has an annular seat between the inlet and the outlet, the mouth of the annular space between the valve element and the seat being curved to permit streamline flow, the control chamber comprising a control cylinder mounted on the valve element, and a piston in the control cylinder cooperating therewith, and a support mounting the piston, the control pressure tap extending from the space between the valve element and the valve seat in open position transversely to the direction of flow communicating with the control cylinder.

21. A steam trap of claim 20, in which the flow between the valve element and the seat converges.

22. A steam trap according to claim 20, in combination with stop means acting between the valve element and the piston and limiting the valve element against fully closing.

23. A steam trap of claim 1, in which cooperating valve surfaces at the inlet have a curved mouth promoting streamline flow between the valve surfaces, the control chamber has a resilient wall operatively connected to the valve element and movable in response to variations in the control chamber pressure and the control pressure tap extends from the space between the valve surfaces transversely to the direction of flow and communicating with the control chamber.

24. A steam trap of claim 23, in combination with a tail piece on the valve, the orifice being located around the tail piece.

25. A steam trap of claim 23, in which the orifice extends through the valve element.

26. A steam trap of claim 23, in which the orifice is formed by a slot in the valve element and the curved mouth for streamlining is provided on the valve seat.

27. A steam trap of claim 23, in which the valve element is a disc, a groove in the disc forms the orifice and cooperates with the valve seat and the control pressure tap is an opening in the disc.

28. A steam trap of claim 1, in which the orifice mouth has a radius of curvature between one-half the diameter and the diameter of the throat of the orifice, and the throat of the orifice has a length not less than one-half the diameter of the throat.

29. A steam trap of claim 28, in combination with a tail piece on the valve element, the orifice being located around the tail piece.

30. A steam trap of claim 28, in combination with a tail piece on the valve element, the orifice being located around the tail piece, and grooves extending across the direction of flow positioned on the tail piece and being carried into the orifice when the valve is in open position.

31. A steam trap of claim 28, in which the orifice extends through the valve element.

32. A steam trap of claim 28, in which the orifice is formed by a slot in the valve element and the curved mouth for streamlining is provided on the valve seat.

33. A steam trap of claim 1, in which the orifice has a curvature at the mouth between one-half the diameter of the throat and the diameter of the throat, the curvature being tangent at the point of juncture with the throat, the throat having a length of between one-half its diameter and five times its diameter and the mouth having a finish of at least 16 micro inches.

34. A steam trap of claim 33, in which the orifice extends through the valve element.

35. A steam trap of claim 33, in which the orifice is formed by a slot in the valve element and the curved mouth for streamlining is provided by the valve seat.

References Cited in the file of this patent

UNITED STATES PATENTS

| | | |
|---|---|---|
| 847,944 | Hubner | Mar. 19, 1907 |
| 1,089,187 | Brown | Mar. 3, 1914 |
| 2,051,732 | McKee | Aug. 18, 1936 |
| 2,234,387 | Schott | Mar. 11, 1941 |
| 2,328,986 | McKee | Sept. 7, 1943 |
| 2,808,210 | Frey | Oct. 1, 1957 |

FOREIGN PATENTS

| | | |
|---|---|---|
| 118,196 | Austrialia | Feb. 28, 1944 |